(12) United States Patent
Benedett

(10) Patent No.: US 10,598,877 B2
(45) Date of Patent: Mar. 24, 2020

(54) ACTIVE OPTICAL CABLE WITH COMMON LASER HUB

(71) Applicant: Precision Optical Transceivers Inc., Rochester, NY (US)

(72) Inventor: Thomas Benedett, Webster, NY (US)

(73) Assignee: PRECISION OPTICAL TRANSCEIVERS INC., Rochester, NY (US)

(*) Notice: Subject to any disclaimer, the term of this patent is extended or adjusted under 35 U.S.C. 154(b) by 0 days.

(21) Appl. No.: 16/391,979

(22) Filed: Apr. 23, 2019

(65) Prior Publication Data

US 2019/0265423 A1 Aug. 29, 2019

Related U.S. Application Data

(62) Division of application No. 15/906,858, filed on Feb. 27, 2018, now Pat. No. 10,324,264.

(51) Int. Cl.
*G02B 6/42* (2006.01)
*G02B 6/44* (2006.01)
*H04B 10/50* (2013.01)
*H04B 10/40* (2013.01)

(52) U.S. Cl.
CPC ......... *G02B 6/4246* (2013.01); *G02B 6/4298* (2013.01); *G02B 6/4416* (2013.01); *H04B 10/40* (2013.01); *H04B 10/503* (2013.01)

(58) Field of Classification Search
CPC .. G02B 6/4246; G02B 6/4416; G02B 6/4298; H04B 10/503; H04B 10/40
See application file for complete search history.

(56) References Cited

U.S. PATENT DOCUMENTS

| | | | |
|---|---|---|---|
| 7,103,277 B2* | 9/2006 | Ridgway | G02B 6/12019 385/24 |
| 7,876,989 B2 | 1/2011 | Aronson et al. | |
| 9,294,290 B2 | 3/2016 | Charbonneau-Lefort et al. | |

* cited by examiner

*Primary Examiner* — Ryan A Lepisto
(74) *Attorney, Agent, or Firm* — Fox Rothschild LLP; Robert J. Sacco

(57) ABSTRACT

Active optical cable (AOC) includes at least one optical fiber constituting a signal transmission medium and a plurality of optical data transceivers disposed at separate connector ends of the AOC assembly. The AOC includes a common laser source in a common laser hub (CLH) providing a source optical signal to the optical data transceivers. The optical data transceivers modulate the source optical signal to form modulated optical data signals. In some scenarios described herein, the CLH is disposed at an intermediate location along a length of the AOC between the separate connector ends of the AOC. Further, a central processor can be provided in the CLH to facilitate consolidated data processing operations for the plurality of optical data transceivers.

7 Claims, 10 Drawing Sheets

ACTIVE OPTICAL CABLE WITH COMMON LASER HUB

CROSS-REFERENCE TO RELATED APPLICATIONS

This application is a divisional application of U.S. application Ser. No. 15/906,858 filed on Feb. 27, 2018, entitled "ACTIVE OPTICAL CABLE WITH COMMON LASER HUB", the entire disclosure of which is incorporated herein by reference.

BACKGROUND

Statement of the Technical Field

The technical field of this disclosure comprises data communication cables, and more particularly concerns active optical cables.

Description of the Related Art

Data centers have an ever-increasing need for higher capacity intra-rack interconnections. Traditionally, these interconnections were made with passive copper cables in which a direct connection was provided between cable connector ends, and transmission was effected by means of copper wire. As the data carrying capacity requirements have grown, active copper cable (ACC) assemblies have been developed to meet the demand. An ACC assembly includes semiconductor electronics within connector ends of the cable improve performance, but the transmission over the length of the cable is still by means of copper wire.

To meet data transmission capacity needs, data centers have transition from ACC to active optical cable (AOC). AOC is a technology that employs optical transceivers and optical fiber disposed between electrical connector ends of the cable to facilitate high data rate communications.

As is known, an optical transceiver is a device that facilitates bi-directional optical data communications using an optical fiber as a transmission medium. A conventional optical transceiver will include a bi-directional electronic data interface, and will include electro-optic conversion elements to encode and decode data into a modulated optical beam of light. The modulated optical beam is then coupled to a fiber optic element for transmission. When the modulated optical beam of light is received by a second optical transceiver at the other end of the optical fiber, an opto-electric component will convert the modulated optical beam to electrical signals so that the data can be decoded. In some scenarios, a second fiber optic element can be provided so that bi-directional optical communications are supported. However, wavelength division multiplexing (WDM) techniques can allow a single optical fiber to be used for bi-directional optical communications.

In an AOC, data signals are converted in the optical transceivers to an optical format which facilitates improved speed and distance performance as compared to conventional copper data cables. The benefits of optical data communications are achieved with AOC while maintaining compatibility with existing standard electrical interfaces. Due to their numerous advantages, AOC assemblies are used for data communications in a wide range of applications including optical backplanes, servers, data storage facilities, routers, switches and so on. Drawbacks of AOC include its greater expense relative to ACC assemblies, and higher power requirements.

Small Form-factor Pluggable (SFP) transceivers and also SFP slots are well-known in the field of data processing. SFP transceivers and the slots which receive them will support a wide variety of different data communication standards. As is known, such SFP transceivers are a hot-swappable devices that can be inserted into an SFP slot or port to facilitate a bidirectional data communication link between the port and a data network. SFP slots and transceivers can be used to facilitate AOC technology. The low cost of SFP devices and their ability to facilitate a connection to optical fiber has led to their wide usage in data processing facilities.

The form factor and electrical interface of an SFP transceiver are specified by a multi-source agreement (MSA). The MSA was developed by the Small Form Factor Committee (SFFC), which is an electronics industry group formed to develop interoperability specifications. SFP modules can include those which are capable of facilitating data communications at rates including 1 Gbit/s (SFP), 10 Gbit/s (SFP+) and 25 Gbit/s (SFP28). For convenience, each of these types of modules are sometimes generically referred to herein as SFP modules.

A conventional AOC assembly can also be comprised a Quad Small Form-factor Pluggable (QSFP) or QSFP+ type of transceiver. The form factor and electrical interface of a QSFP transceiver are specified by an MSA developed by the SFFC. The standard specifies transceivers which facilitate data rates which include 4×1 Gb/s for QSFP, 4×10 Gbit/s for QSFP+, and 4×28 Gbit/s for QSFP28. For convenience, each of these types of modules are sometimes generically referred to herein as QSFP modules.

SUMMARY

This document concerns an active optical cable (AOC). The AOC includes at least one optical fiber constituting a signal transmission medium and a plurality of optical data transceivers. For example a first optical data transceiver and a second optical data transceiver can be respectively disposed at separate connector ends of the AOC (e.g., separate connector ends disposed at opposing ends of an AOC assembly). In some scenarios, the optical data transceivers can be configured to conform to a defined standard for at least one of Small Form-factor Pluggable (SFP) transceiver or a Quad Small Form-factor Pluggable (QSFP) transceiver. For example, the first optical data transceiver can be an SFP or QSFP transceiver and the second optical data transceiver can be an SFP or QSFP transceiver.

The AOC includes a common laser source. The common laser source is configured to provide a source optical signal to the plurality of optical data transceivers. The plurality of optical data transceivers are each configured to modulate the source optical signal received from the common laser source to form a modulated optical data signal to facilitate optical data transmission through the at least one optical fiber. The common laser source is advantageously disposed in a common laser hub (CLH). In some scenarios described herein, the CLH is disposed at an intermediate location along a length of the AOC between the separate connector ends of the AOC.

According to one aspect, the at least one optical fiber provided in the AOC includes a first optical fiber extending between the separate connector ends of the AOC and configured to facilitate optical data transmission between the first and second optical data transceivers. The AOC can also include a second optical fiber extending from the CLH to the separate connector ends. The second optical fiber in such scenarios is configured to facilitate transmission of the source optical signal from the CLH to the first and second optical transceivers.

The AOC also includes at least one electrical conductor extending respectively from the plurality of optical data transceivers to the CLH. The electrical conductors are configured to couple electrical power respectively from the plurality of optical data transceivers to the CLH to power the common laser source.

In an AOC described herein each of the plurality of optical data transceivers is configured to be received by an electronic data port or slot having a predefined or standardized configuration. As such, each of the electronic data ports or slots in which the optical data transceivers are configured to be received has a defined maximum permissible power output. In this regard, a power requirement of the CLH can be configured to exceed the maximum permissible power output established for at least one electronic data port or slot because it draws power from multiple slots. In some scenarios, the CLH includes a power supply protection circuit which is configured to prevent a power output of each electronic data port or slot from exceeding the maximum permissible power output.

In some scenarios, the AOC includes a central control electronic processor which is disposed in the CLH. The central control electronic processor in such scenarios can be configured to facilitate consolidated data processing operations needed to support operation of each of the plurality of optical data transceivers. For example, the central electronic control processor can support consolidated data processing operations to support the operation of all of the plurality of optical data transceivers. In such scenarios, at least one control data communication element can be provided as part of the AOC. The control data communication element is configured to facilitate data communications between the central control processor in the CLH and each of the plurality of optical data transceivers. For example, the control data communication element can be a wired data communication bus extending between the CLH, a wireless communication network or an optical fiber.

The optical data transceivers described herein can include a bi-directional electronic data interface configured to facilitate bi-directional electronic data communication with an electronic data port. They can also include a transmit optical sub-assembly (TOSA) including an optical modulator and a receive optical sub-assembly (ROSA). Each of the TOSA and the ROSA is in communication with the bi-directional electronic data interface and optically coupled to the at least one optical fiber of the AOC.

This document also concerns a method for operating an AOC. The method can involve communicating an optical laser source signal from a CLH to a plurality of optical data transceivers disposed at separate connector ends of the AOC. The plurality of optical data transceivers in such scenarios can include a first optical data transceiver and a second optical data transceiver. The method further involves modulating the optical laser source signal received in each of the first and second optical transceivers using an optical modulator. The optical modulators respectively generate a first and second modulated optical data signal. These modulated optical data signals are respectively coupled to a first and second optical fiber of the AOC. Accordingly, the first and second optical fibers can be used to facilitate optical data communications between the first and second optical data transceivers. The method also involves communicating the optical laser source signal to the plurality of optical data transceivers using at least a third and a fourth optical fiber which respectively extend from the CLH to each of the plurality of optical data transceivers.

In some scenarios, the method can involve selecting a location for the CLH which is at an intermediate point along an elongated length of the AOC between the separate connector ends. Further, the method can involve coupling electrical power from the plurality of optical data transceivers to the CLH to provide electrical power for the common laser source. To further reduced the parts count and power consumption of the AOC, the method can involve consolidating processing operations for the plurality of optical data transceivers in a central control processor located in the CLH. Such consolidated processing operations can be facilitated by communicating control data between the CLH and the plurality of optical data transceivers using at least one data communication element selected from the group consisting of a wired interface bus and an optical fiber.

BRIEF DESCRIPTION OF THE DRAWINGS

This disclosure is facilitated by reference to the following drawing figures, in which like numerals represent like items throughout the figures, and in which.

DETAILED DESCRIPTION

Figure 1:
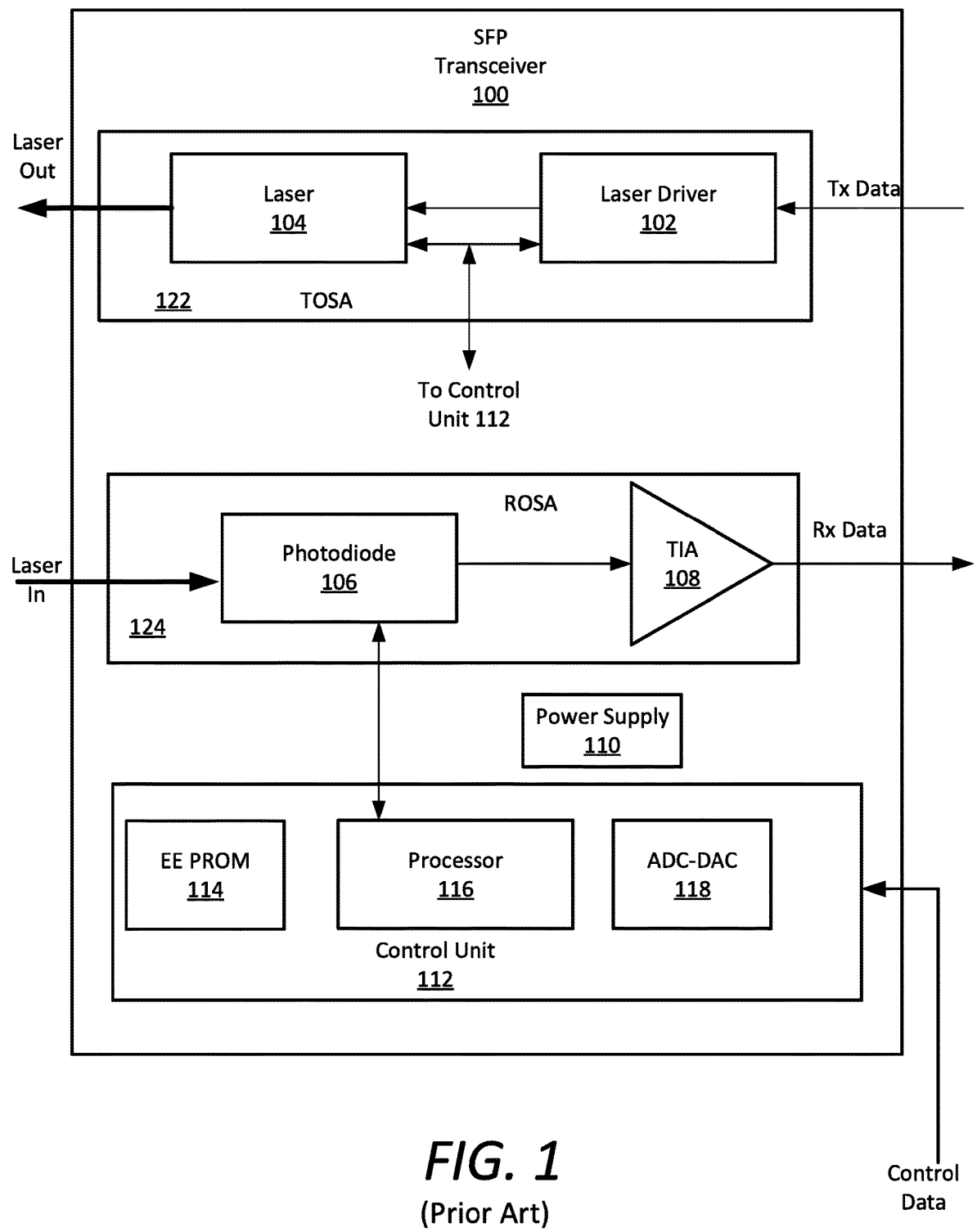
FIG. 1 is a block diagram of a prior art SFP transceiver.

It will be readily understood that the components of the systems and/or methods as generally described herein and illustrated in the appended figures could be arranged and designed in a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

The future of active optical cable (AOC) technology will necessitate greater data transmission carrying capacity, lower power consumption, lower parts count and lower cost per Giga-bit of data carrying capacity. Accordingly, a solution is disclosed herein to meet these growing technological and market driven requirements.

Shown in FIG. 1 is a block diagram which is useful for understanding various components of a conventional SFP transceiver which is used in an AOC assembly. The SFP transceiver 100 includes a transmitter optical sub-assembly (TOSA) 122 and a receiver optical sub-assembly (ROSA) 124 which together comprise a transceiver. A conventional SFP will also include a power supply 110 and a control unit 112.

A TOSA is well known construct in the field of optical communications and therefore will not be described here in detail. However, it will be appreciated that a TOSA 122 is designed to convert electronic data signals into a modulated optical signal which can be coupled to an optical fiber by means of a suitable optical interface (not shown in FIG. 1). Accordingly, a conventional TOSA 122 will include laser driver circuitry 102 which receives transmit data in an electronic format, and a laser source 104 which is responsive to the laser driver circuitry to produce a modulated optical laser output signal. Other components such as filter elements and isolators (not shown) may also be present within the TOSA 120.

A ROSA 124 is also well known construct in the field of optical communications and therefore will not be described here in detail. However, it should be understood that a ROSA 124 is conventionally used to receive an optical signal communicated through an optical fiber and convert such signal to an electrical format. As such, the ROSA 124 can include a photodiode 106 for converting an optical signal to electronic format, and a transimpedance amplifier (TIA) 108 for increasing the signal output voltage of the photodiode. Other components may also be present in the ROSA but the foregoing description is sufficient for the purposes of this disclosure.

The ROSA and the TOSA operate under the control of a control unit 112. The control unit can include electronic data storage such as EE PROM 114. The electronic data storage can contain data and instructions for use by a microprocessor 116. The control unit can also include an analog-to-digital converter (ADC) and a digital-to-analog converter (DAC) (collectively ADC/DAC) 118 to facilitate monitoring and control operations with respect to the ROSA and TOSA. For example, it is known in the field of optical transceivers that these components can be used to control and/or monitor voltage bias levels applied to certain components, such as the laser and photodiode.

A conventional SFP will include a single data transceiver channel as shown in FIG. 1. In contrast, a QSFP will include four data channels. Accordingly, a conventional QSFP transceiver will be similar to the SFP except that it will include components sufficient to implement a TOSA and an ROSA for each of the four data channels. QSFP constructs are well-known in the art and therefore will not be described here in detail.

Figure 2:
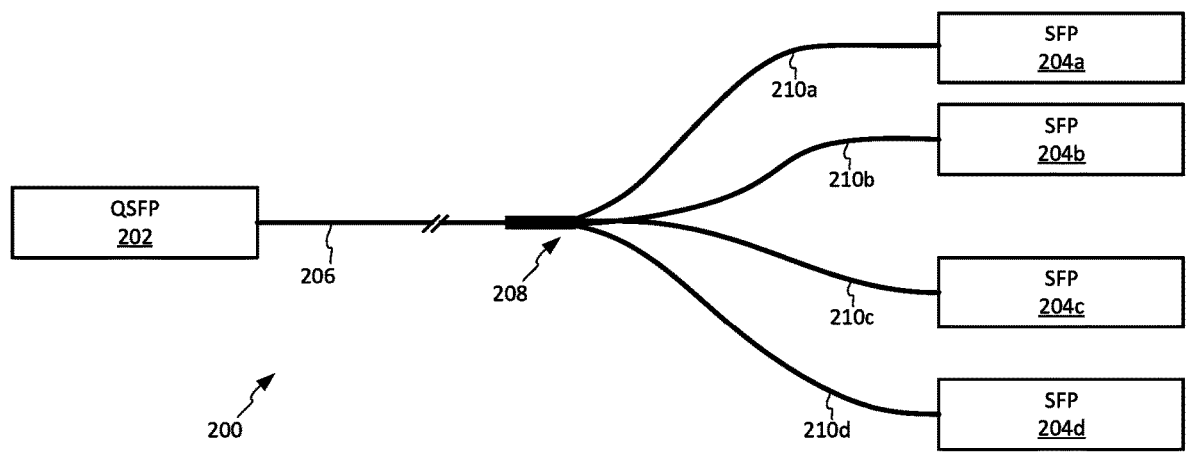
FIG. 2 is a diagram that is useful for understanding a prior art active optical cable (AOC).

One common type of AOC is a 4×1 configuration shown in FIG. 2. As shown in FIG. 2, the 4×1 type of AOC can include a single QSFP transceiver 202 on a first end of an AOC assembly 200. However, a main cable section 206 for such assembly splits at a predetermined breakout point 208 along its length to form four separate cables sections 210a, 210b, 210c, 210d (collectively, 210a-d) each connected to a separate SFP port 204a, 204b, 204c, 204d. In such configurations, two optical fibers can be used to facilitate bi-directional optical communications between a single SFP port and one channel of the QSFP port. Accordingly, each of the four separate cable sections 210a-d would individually comprise two optical fibers. These optical fibers can be brought together in the main cable portion 206 to include a total of 8 optical fibers. Of course, an AOC utilizing wavelength division multiplexing could be made to work with a lesser number of optical fibers.

In the AOC assembly 200, each SFP and QSFP is an autonomous unit which derives power from a socket to which it is connected. Further, each SFP and QSFP will contain its own laser and associated electronics to facilitate the necessary transceiver operations. However, to meet current data capacity demands, existing AOC assemblies as shown in FIG. 2 are nearing the limit of the specified power budget available from the data socket where they draw their electrical power. For example the power budget is 3.5 W for a QSFP and 1.5 W for each SFP.

Figure 3:
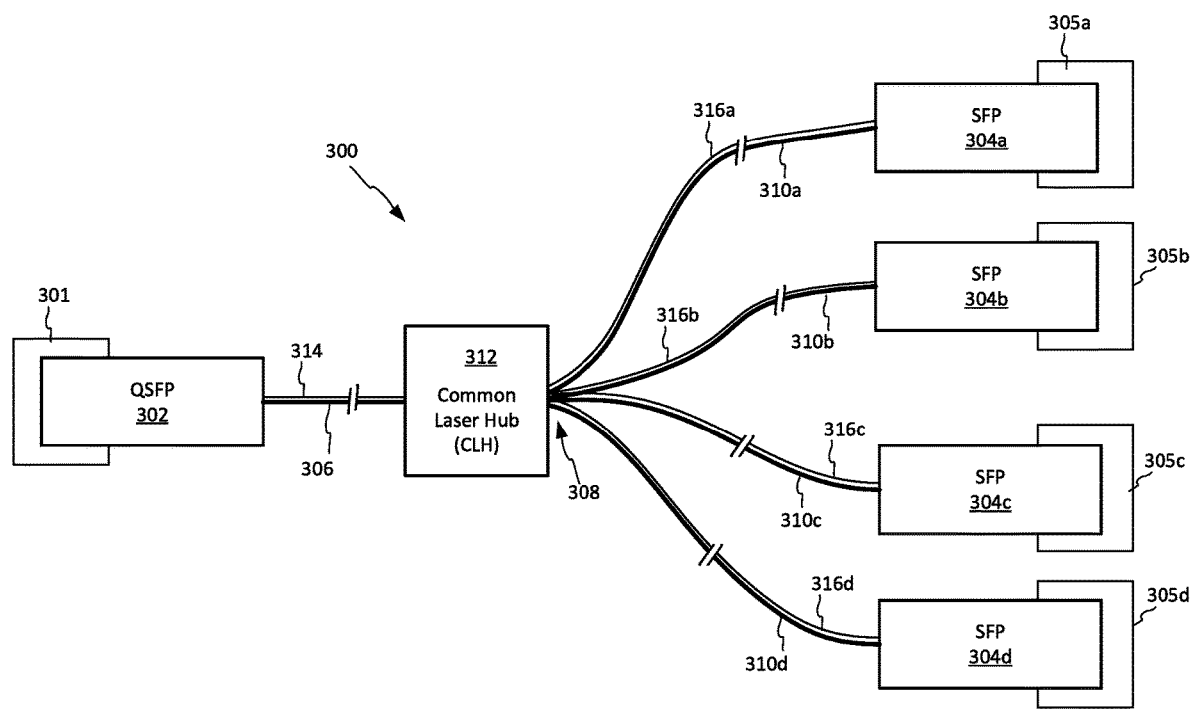
FIG. 3 is a diagram that is useful for understanding an AOC with a common laser hub.

The solution disclosed herein concerns an AOC with a common laser hub as shown in FIG. 3. For convenience, the solution is disclosed in the context of a 4×1 AOC assembly 300 that is similar in this respect to the arrangement shown in FIG. 2. However, it should be understood that the solution herein is not limited to a 4×1 configuration as shown. Instead, the solution disclosed herein can be used in any NxM configuration of an AOC, where N and M are integer values specifying the number of ports at each opposing end of the AOC.

In the 4×1 scenario shown in FIG. 3 a QSFP transceiver 302 is disposed on a first end of an AOC assembly 300. Main cable section 306 is split at a predetermined breakout point along its length to form a plurality (in this case four) of separate cable sections 310a, 310b, 310c, 310d (collectively 310a-d), each connected to an SFP transceiver 304a, 304b, 304c, 304d (collectively 304a-d). Cable sections 306 and 310a-d can each be comprised of one or more optical fibers. For example, in some scenarios each of the four cable sections 310a-d would individually comprise three (3) optical fibers. These optical fibers can be brought together in the main cable section 306 to include a total of nine (9) optical fibers. The purpose of the various optical fibers in each cable section will be described below in greater detail. The optical fibers described herein can be of relatively long length. For example, each of the optical fibers can range from a few meters in length to 100 meters or more. In an operational scenario depicted in FIG. 3, the QSFP transceiver 302 can be connected to a QSFP slot 301, and the SFP transceivers 304a-d can be respectively connected to an SFP slot 305a, 305b, 305c, 305d (collectively 305a-d).

It can be observed in FIG. 3 that the AOC assembly 300 includes a common laser hub (CLH) 312. In some scenarios, the CLH can be located at a point along the length of main cable section 306 that is intermediate of the SFP and QSFP transceivers as shown. It can be convenient in some scenarios to select this location so as to correspond to the location of the breakout point 308. Still, in other scenarios the CLH 312 can be located at a point along the length of main cable section 306 or along one of the separate cable sections 310a-d. In some scenarios, the CLH can be located adjacent to a QSFP 302 or SFP 304a-d. Also, in some scenarios all or part of the CLH can be integrated with a QSFP or an SFP.

Figure 4:
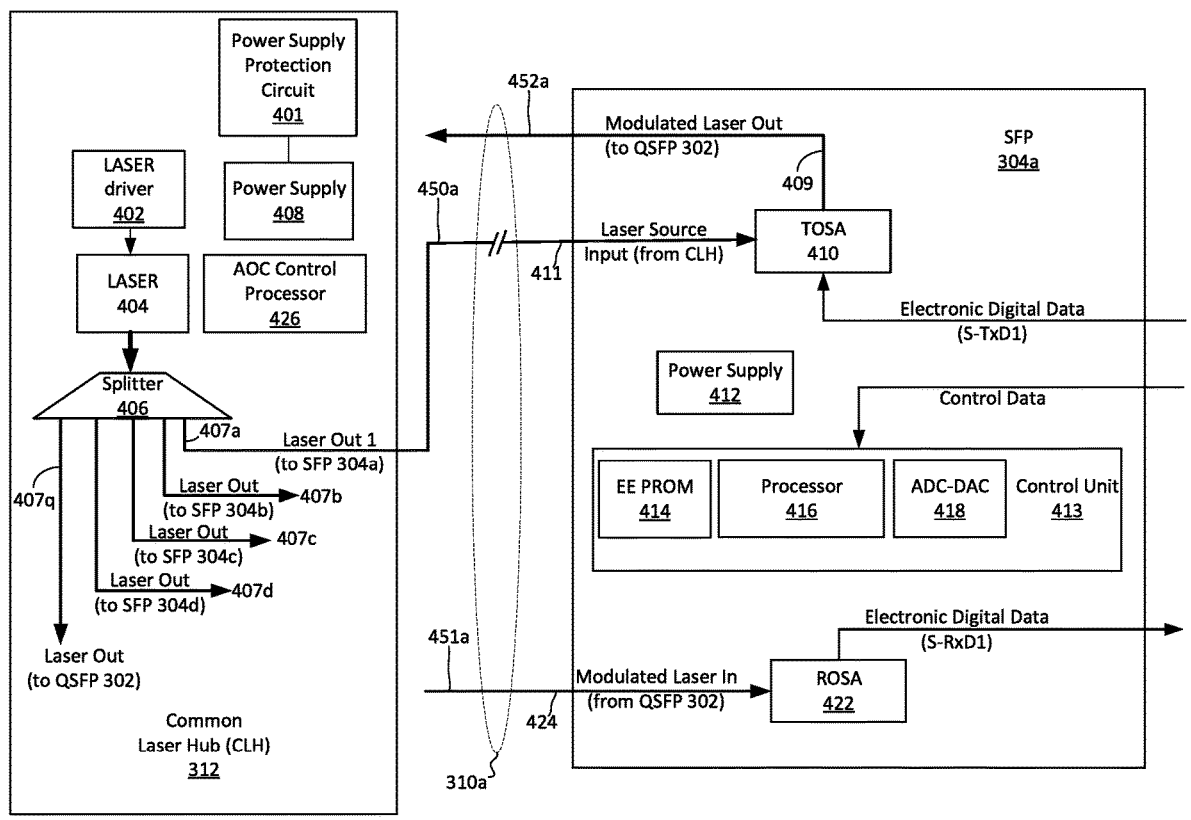
FIG. 4 is a detailed block diagram that is useful for understanding certain aspects of the AOC in FIG. 3.
Figure 5:
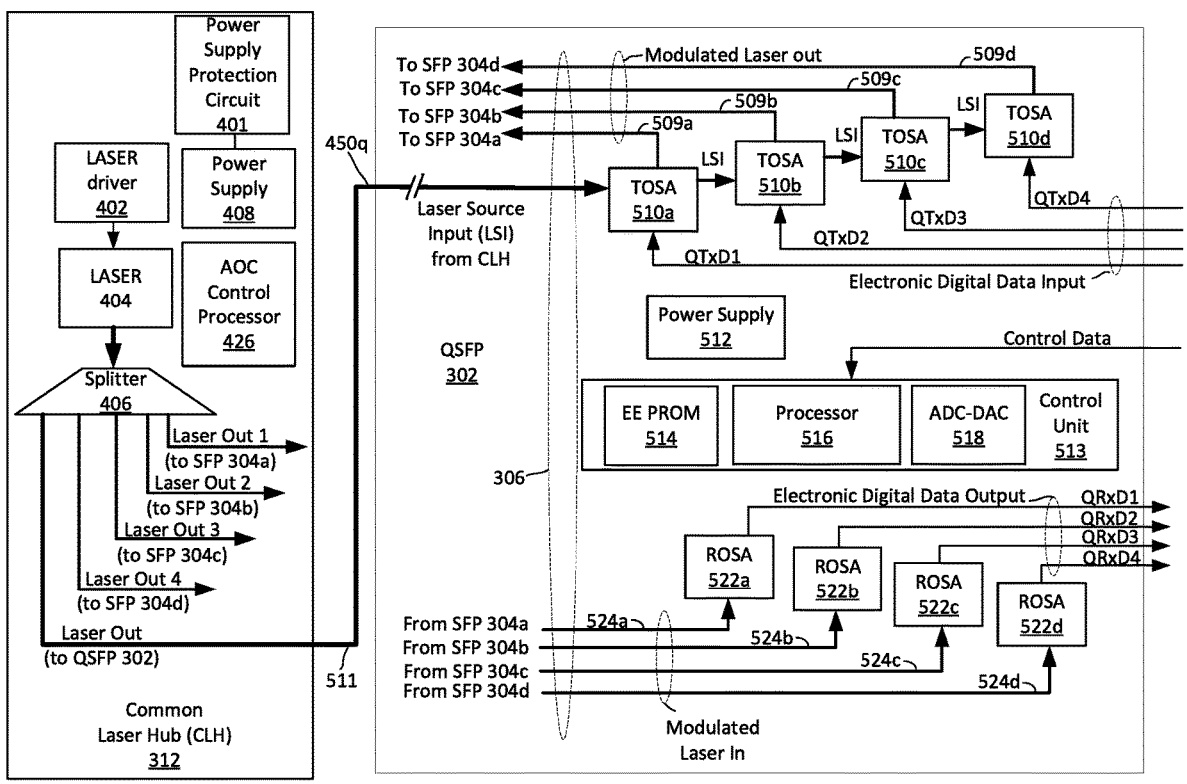
FIG. 5 is a detailed block diagram that is useful for understanding certain aspects of the AOC in FIG. 3.

The features and functions associated with the AOC assembly 300 will now be described in further detail with respect to FIG. 4-6. As shown in FIGS. 4 and 5, the CLH 312 can include laser driver circuitry 402 which drives a laser source 404, one or more optical splitters or power dividers 406, and a power supply 408. The laser source 404 communicates optical laser energy to the one or more optical splitters 406, which split the laser energy into a plurality of optical output paths 407a, 407b, 407c, 407d, 407q. Each of the optical output paths 407a, 407b, 407c, 407d is respectively optically coupled to one of the SFPs 304a-d. For example, an optical fiber can be included in each of the cable sections 310a-d specifically to communicate the source laser energy from the CLH 312 to the individual SFPs 304a-d. Similarly, optical output path 407q is optically coupled to QSFP 302. An optical fiber for communicating this source laser energy to the QSFP 302 can be included in the main cable section 306. With the foregoing arrangement, source optical laser energy from a common laser source, (e.g., a single common laser source 404) can be optically coupled to QSFP 302 and each of SFP 304a-d.

Also shown in FIG. 4 is a single SFP node 304a associated with the AOC 300. The other SFP nodes 304b, 304c, and 304d are omitted for greater clarity in the drawing. However, it should be understood that SFP nodes 304b, 304c, and 304d would have a configuration similar to that which is shown in FIG. 4. The SFP 304a includes a transmitter optical sub-assembly (TOSA) 410, a receiver optical sub-assembly (ROSA) 422, and a power supply 412. The TOSA 410 and ROSA 422 can be implemented as a photonic integrated circuit or PIC. For example, the TOSA and ROSA in some scenarios could be implemented in Silicon photonics.

The SFP 304a also includes a control unit 413. The control unit is comprised of a data storage medium such as EE PROM 414, an electronic processing device or processor 416, and ADC-DAC 418. The processor 416 can be a microprocessor, microcontroller, or any other type of electronic processing element. The power supply and control system components will not be described in detail. It should be understood that these components will perform functions similar to corresponding components in a conventional SFP.

The ROSA 422 can comprise functional components similar to that of a conventional ROSA. As such, the ROSA will receive from QSFP 302 a modulated optical signal 424 by way of an optical fiber 451a. The ROSA will then extract electronic digital data S-RxD1 from the modulated optical signal which has been received. The electronic data will then be communicated to an electronic processing device to which the SFP is connected. The ROSA could have a configuration similar to the ROSA 124 shown in FIG. 1. However, in some scenarios the photodiode within the ROSA can be implemented in Silicon photonics. As is known, a Silicon photonic photodiode can consume less space and less power as compared to a conventional photodiode. Still, it should be understood that the exact configuration of the ROSA is not critical and any suitable implementation now known or known in the future can be used for this purpose.

The TOSA 410 is used to convert electronic data signals to a modulated optical signal which is then coupled to an optical fiber link (in this case, optical link 310a). But TOSA 410 differs from a conventional TOSA insofar as it does not include its own laser driver and source optical laser. Instead, the source optical laser 404 resides in the CLH 312. The laser energy from the source optical laser 404 is communicated to the TOSA 410 by means of an optical fiber 450a included in cable section 310a. TOSA 410 will receive electronic digital data S-TxD1 from a server, switch, router or other type of electronic processing system. The electronic digital data is used in the TOSA 410 to modulate the source optical laser energy 411 from the CLH 312, whereby a modulated laser output signal 409 is produced. The exact method used in TOSA 410 to modulate the optical laser source signal 411 is not critical. Any optical modulation method now known or known in the future, can be used for this purpose. For example, in some scenarios, an optical modulator for the TOSA can be implemented in Silicon photonics. The resulting modulated laser output signal 409 is then coupled by way of an optical interface (not shown) to optical fiber 452a for transmission the QSFP 302.

Shown in FIG. 5 is another aspect of the AOC 300 which includes the QSFP 302. The QSFP 302 includes a TOSA modules 510a, 510b, 510c, 510d (collectively 510a-d) and ROSA modules 522a, 522b, 522c, 522d (collectively 522a-d) to facilitate each of four data transceiver channels. The QSFP 302 also includes a control unit 513. The TOSAs 510a-d and ROSAs 522a-d can be implemented as a PIC. For example, the TOSAs 510a-d and ROSAs 522a-d can in some scenarios be implemented in Silicon photonics.

The control unit 513 is comprised of a data storage medium such as EE PROM 514, an electronic processing device or processor 516, and ADC-DAC 518. The QSFP also includes a power supply 512. The processor 516 can be a microprocessor, microcontroller, or any other type of electronic processing element. The power supply 512 and control system components will not be described in detail. It should be understood that these components will perform functions similar to corresponding components in a conventional QSFP. Each ROSA 522a-d will likewise facilitate functions similar to that of a conventional ROSA. Each ROSA 522a-d will respectively receive from an SFP 304a-d a modulated optical signal 424a, 424b, 424c, 424d by way of optical fibers included an main cable section 306. Each ROSA will extract an electronic digital data QRxD1, QRxD2, QRxD3 and QRxD4 from the received modulated optical signal which has been received. The electronic data will then be communicated to an electronic processing device to which the QSFP is connected.

Each TOSA 510a-d is used to convert electronic data signals to a modulated optical signal which is then coupled to an optical fiber link (in this case, main cable section 306). But the TOSAs 510a-d differ from conventional TOSAs insofar as they do not include a source laser or associated laser driver electronics. Instead, the TOSAs receive a source optical laser energy from a source laser 404 located at the CLH 312. The laser energy from the source optical laser 404 is communicated to each TOSA 510a-d by means of one or more optical fibers included in the main cable section 306. A TOSA 510a-d will respectively receive electronic digital data QTxD1, QTxD2, QTxD3, QTxD4 from a server, switch, router or other type of electronic processing system. The electronic digital data is used to control an optical modulator (not shown) in each TOSA. The optical modulator in each TOSA 510a-d modulates the source optical laser energy 511 from the CLH 312, whereby a modulated laser output signal 509a, 509b, 509c, 509d (collectively 509a-d) is produced. The exact method used in each TOSA 510a-d to modulate the optical laser source signal 511 is not critical. Any suitable optical modulator now known or known in the future, can be used for this purpose. The resulting modulated laser output signal 509a-d is then coupled by way of an optical interface (not shown) to main cable section 306 containing optical fibers (four optical fibers in this example) to facilitate transmission of each modulated laser output signal to a respective SFP 304a-d.

In some scenarios, a CLH 312 can function only as a centralized optical source which feeds each of the QSFP 302 and SFPs 304a-d. In such scenarios, local data processing and control facilities are not required at the CLH. However, in other scenarios, processing functions associated with the QSFP 302 and one or more of the SFPs 304a-d can be offloaded from these nodes to the CLH 312. In a conventional AOC, each SFP and QSFP is a completely independent and autonomous node which includes its own processing capability. In the SFP 302 and 304a shown in FIGS. 4 and 5 this independent processing functionality is shown as residing in a processor 416, 516. But in one scenario disclosed herein, the processing functions associated with one or more of such nodes can be centrally consolidated in an AOC control processor 426. This single processing element at the hub can then be used to facilitate control over the QSFP 302, and/or one or more SFPs 304a-d. For example, the AOC control processor 426 can in some scenarios be used to facilitate control functions over all of the end nodes, including QSFP 302 and SFPs 304*a-d*. This approach can effectively eliminate the need for a processor element in each of the end nodes. It should be noted that the foregoing consolidated processing approach can also be applied without the use of a centralized laser source in the CLH. In such scenarios, each of the optical transceivers could have its own optical source, but processing operations would be consolidated in the CLH as described herein to reduce parts count. In such scenarios, the CLH could more properly be referred to as a central processing hub (CPH).

To facilitate monitoring and control operations in such a scenario, one or more electrical conductors can be included in the cable sections 306 and 310*a-d*. For example, such conductors can be arranged to facilitate a conventional data bus (e.g. a conventional I2C data bus) through which the AOC control processor can communicate with QSFP 302 and SFPs 304*a-d*.

Of course other data transmission mechanisms could also be used to facilitate these monitoring and control operations involved with an AOC control processor. For example, in some scenarios the CLH could be equipped with a second optical source which produces laser light having a different wavelength as compared to laser 404. Wavelength division multiplexing could then be used to facilitate optical data communication between the AOC control processor and each SFP/QSFP. Any of the optical fibers provided for communicating payload data and/or the optical laser source signal to the QSFP 302 and/or SFPs 304*a-d* could be used for this purpose. With present laser source technology, an additional source of power for the CLH 312 could be required in such scenarios to ensure that the second laser source at the CLH 312 does not exceed power consumption constraints associated with the SFPs 304*a-d* and QSFP 302. However, it is anticipated that as more efficient laser sources become available in the future, such additional power sources would be unnecessary. In a further alternative scenario, the communication of monitoring and control operations could be carried out using conventional wireless networking. In such scenarios a suitable network interface circuit would be required in each of the CLH 312, QSFP 302, and SFPs 304*a-d*. The solution disclosed herein has a number of benefits. It reduces redundant parts count in the end nodes, including the QSFP 302, and SFPs 304*a-d*. This reduction in parts count reduces AOC production costs. The reduced parts counts and consolidation of functionality also has the potential to reduce power consumption associated with the AOC. The reduction in power consumption has the benefit of reducing heat in the data center where the AOC is used, particularly in facilities where a large number of AOC are employed. Reduced heat production facilitates reduced cooling costs in the data center.

Reduced power consumption is also an important consideration from the standpoint of continuing to increase data capacity of AOCs. To meet current data capacity demands conventional AOCs are already nearing the limit of the specified power budget for SFP and QSFP device slots or sockets. For QSFP the power budget is 3.5 W and for SFP the power budget is 1.5 W. So the consolidation of function opens up the possibility of reducing the power demand from each socket. It also opens the possibility of implementing a CLH 312 which has power requirements that exceed the power budget of any one slot QSFP or SFP slot. In a scenario disclosed herein, electrical power can be drawn from multiple device slots or sockets and used where needed in the AOC, rather than being limited to usage at the one device that is connected to the particular slot.

To facilitate the operation of a CLH 312 as described herein, electrical power can be communicated to the CLH 312 from one or more of the QSFP and SFP transceivers/slots. Accordingly, a main cable section 306 can be supplemented by one or more electrical conductors 314 from a QSFP transceiver 302 to the CLH 312. Similarly, cable sections 310*a-d* can be supplemented by one or more electrical conductors 316*a*, 316*b*, 316*c*, 316*d* (collectively 316*a-d*). The one or more electrical conductors can be used couple electric power from the QSFP/SFP transceiver(s) to the CLH 312. In a scenario involving use of an AOC control processor, the one or more electrical conductors 314/316*a-d* can also be used for signaling and control data whereby the AOC control processor can supervise the operation of the QSFP/SFP transceiver(s).

In a scenario disclosed herein where the CLH 312 draws electrical power from two or more of the QSFP/SFP transceivers, care must be taken not to exceed a specified maximum power consumption allowed for a QSFP/SFP slot. In this regard it will be appreciated that there may be instances when less than all of the QSFP/SFP transceivers are inserted into a slot. This creates a possibility that power consumption from any one slot may exceed a maximum permitted value. For example, this problem could occur where the CLH 312 draws more power than can be supported by one or more individual QSFP/SFP slots. To reduce this risk, a power supply protection circuit 401 can be included in CLH 312 to ensure that the hub will not fully power up until the required number of power sources are determined to be present and available.

Figure 6A:
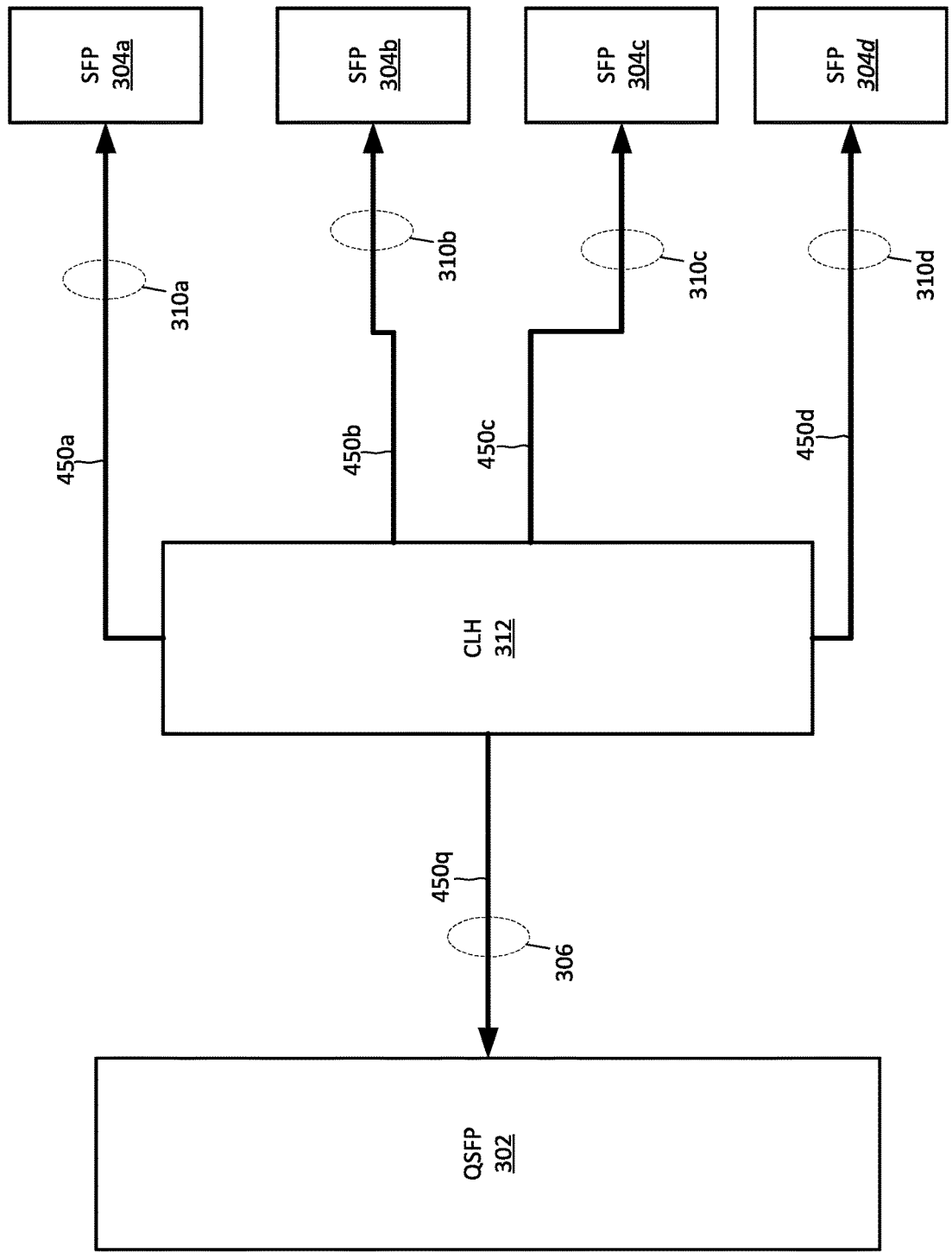
FIG. 6A-6D are schematic diagrams that are useful for understanding certain optical and electrical interconnections in the AOC in FIG. 3.
Figure 6B:
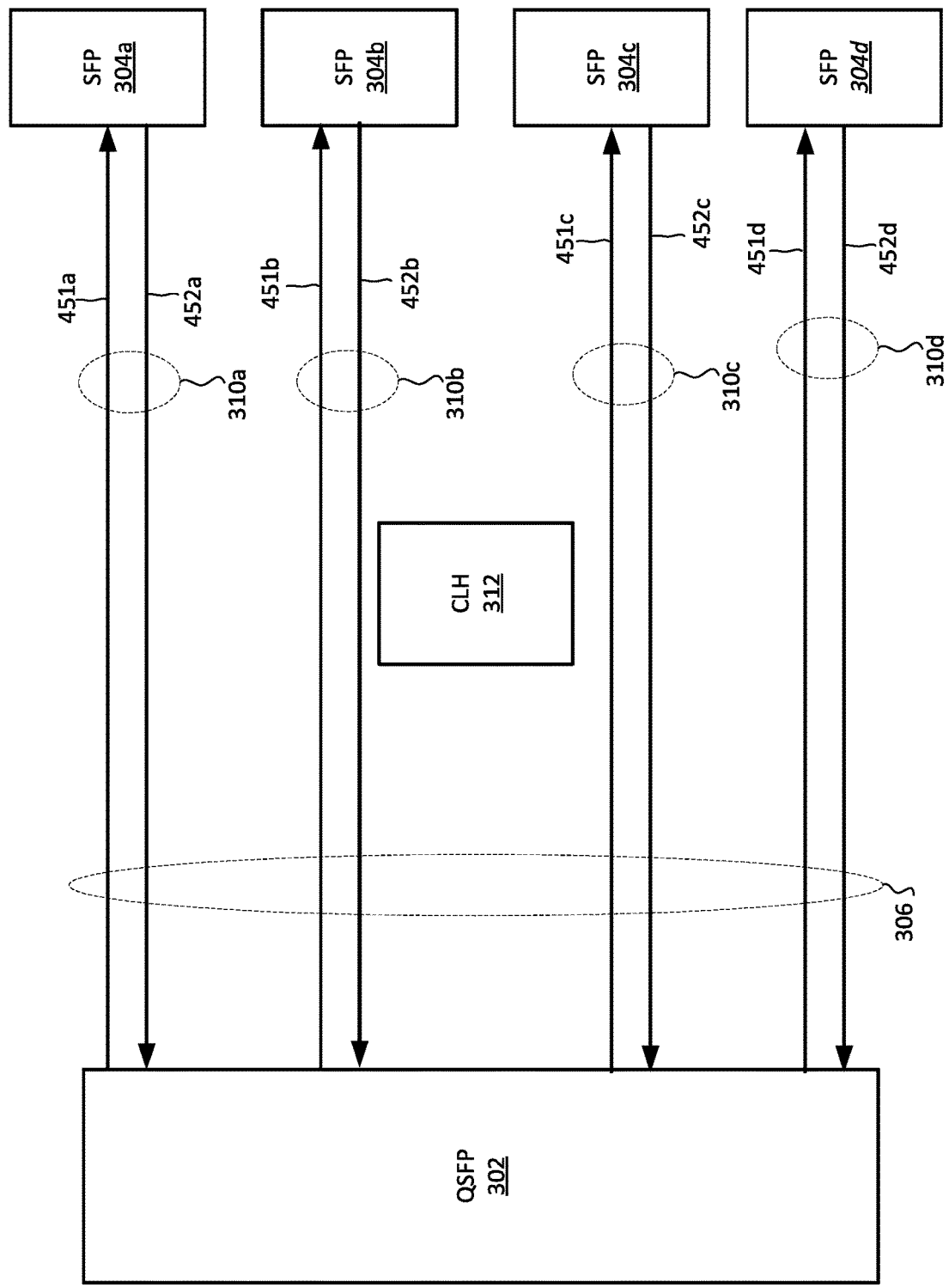
Figure 6C:
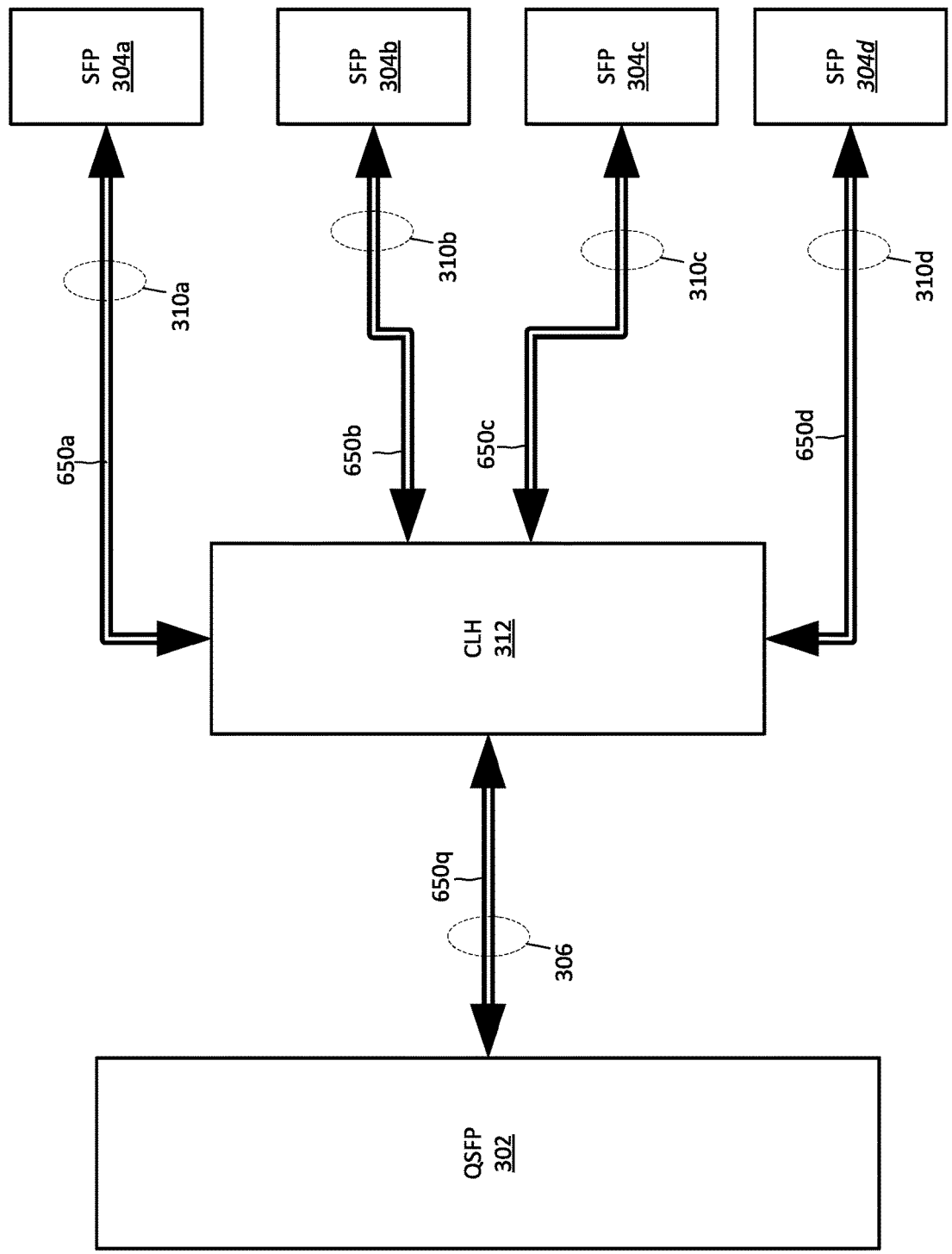
Figure 6D:
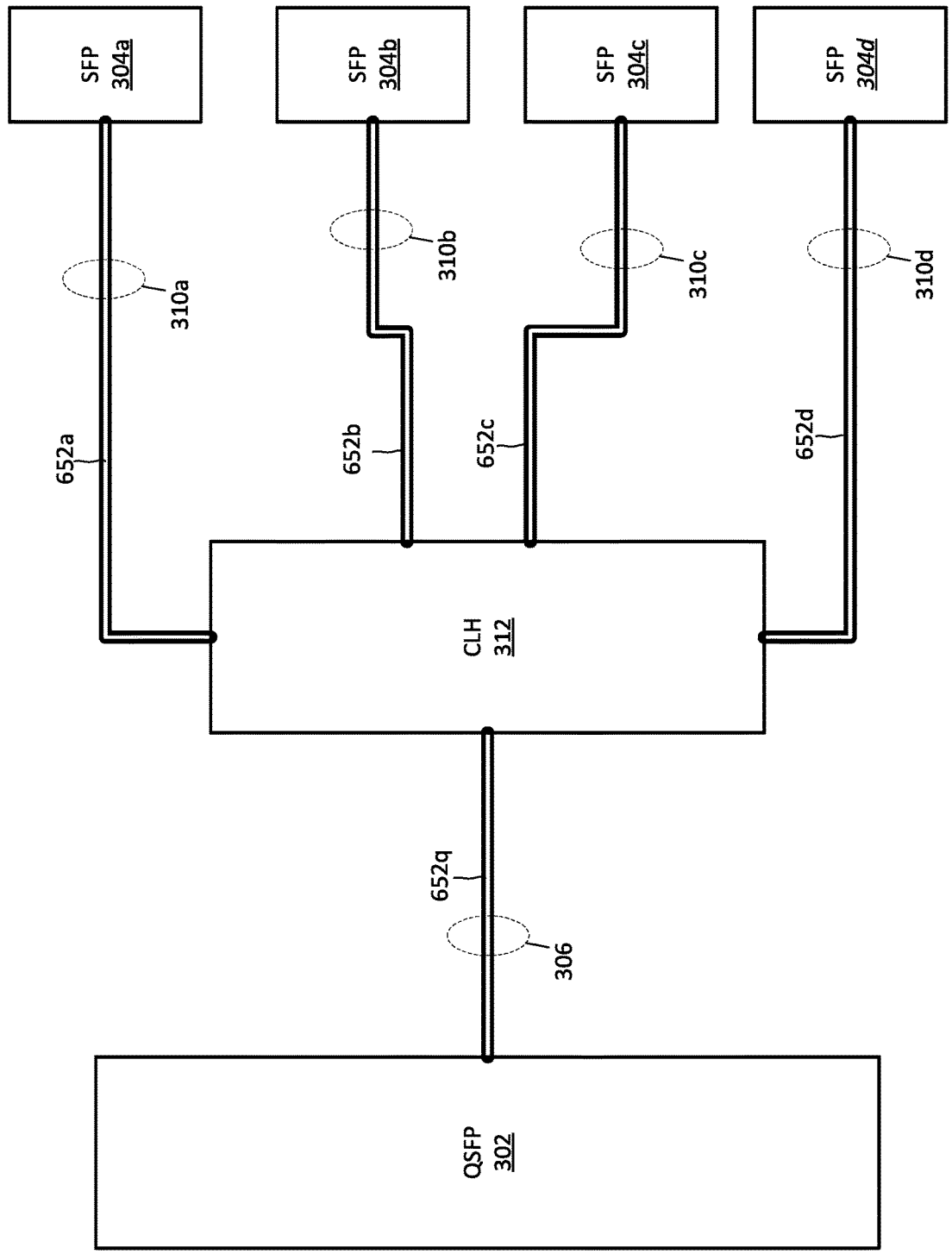
Figure 7:
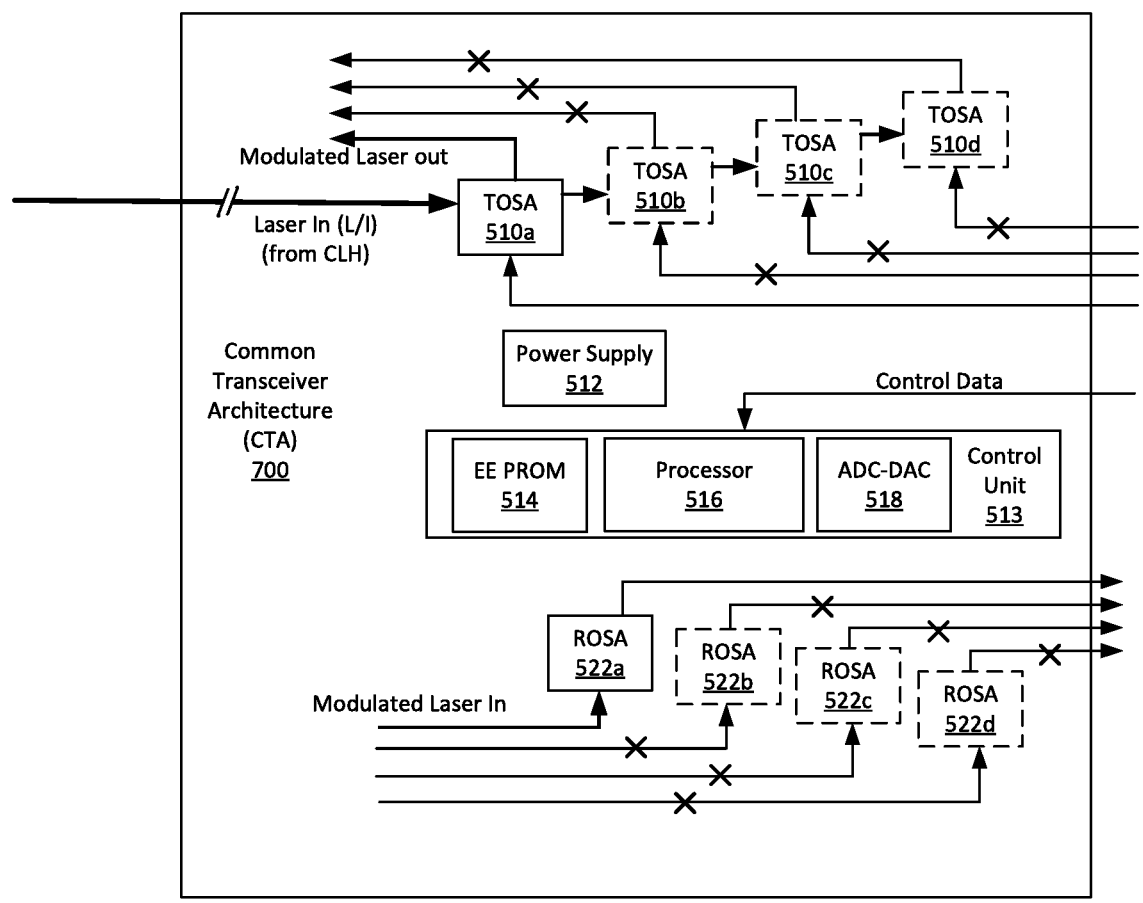
FIG. 7 is useful for understanding a common transceiver architecture that can be used for manufacturing an AOC disclosed herein.

Shown in FIG. 6A is a drawing which is useful for understanding the various optical fiber interconnections 450*q*, 450*a-d* associated with distribution of optical energy from an optical laser source in CLH 312 to QSFP 302 and SFPs 304*a-d* in an AOC 300 as described herein. FIG. 6B is a drawing that is useful for understanding the various optical fiber interconnections for communicating modulated optical data signals between the QSFP 302 and the SFPs 304*a-d*. FIG. 6C is useful for understanding conductive wire interconnects 650*a*, 650*b*, 650*c*, 650*d*, 650*q* which comprising a data bus which facilitates command and control operations in a scenario where a central AOC control processor 426 is used to perform command and control operations for all of the QSPF/SPF connector ends. FIG. 6D is useful for understanding conductive wire interconnects 652*a*, 652*b*, 652*c*, 652*d*, 652*q* which couple electrical power from connector ends comprising the QSPF 302 and SPFs 304*a-d*.

Shown in FIG. 6A is a drawing which is useful for understanding the various optical fiber interconnections 450*q*, 450*a-d* associated with distribution of optical energy from an optical laser source in CLH 312 to QSFP 302 and SFPs 304*a-d* in an AOC 300 as described herein. FIG. 6B is a drawing that is useful for understanding the various optical fiber interconnections for communicating modulated optical data signals between the QSFP 302 and the SFPs 304*a-d*. FIG. 6C is useful for understanding conductive wire interconnects 650*a*, 650*b*, 650*c*, 650*d*, 650*q* which comprising a data bus which facilitates command and control operations in a scenario where a central AOC control processor 426 is used to perform command and control operations for all of the QSFP/SFP connector ends. FIG. 6D is useful for understanding conductive wire interconnects 652*a*, 652*b*, 652*c*, 652*d*, 652*q* which couple electrical power from connector ends comprising the QSFP 302 and SFPs 304*a-d*.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with a particular implementation is included in at least one embodiment. Thus, discussions of the features and advantages, and similar language, throughout the specification may, but do not necessarily, refer to the same embodiment.

I claim:

1. A method for operating an active optical cable (AOC) comprising:
    communicating an optical laser source signal from a common laser source disposed in a common laser hub (CLH) to a plurality of optical data transceivers disposed at separate connector ends of the AOC, the plurality of optical data transceivers including a first optical data transceiver and a second optical data transceiver;
    coupling electrical power from the plurality of optical data transceivers to the CLH to provide electrical power for the common laser source;
    modulating the optical laser source signal received in each of the first and second optical transceivers using an optical modulator to generate a first and second modulated optical data signal; and coupling the first and second modulated optical data signals to a first and second optical fiber of the AOC.

2. The method according to claim 1, further comprising using the first and second optical fibers to facilitate optical data communications between the first and second optical data transceivers.

3. The method according to claim 2, further comprising communicating the optical laser source signal to the plurality of optical data transceivers using at least a third and a fourth optical fiber which respectively extend from the CLH to each of the plurality of optical data transceivers.

4. The method according to claim 1, further comprising selecting a location for the CLH which is at an intermediate point along an elongated length of the AOC between the separate connector ends.

5. The method according to claim 1, further comprising consolidating processing operations for the plurality of optical data transceivers in a central control processor located in the CLH.

6. The method according to claim 5, further comprising communicating control data between the CLH and the plurality of optical data transceivers using at least one data communication element selected from the group consisting of a wired interface bus and an optical fiber.

7. An active optical cable (AOC) comprising:
    at least one optical fiber constituting a signal transmission medium;
    a plurality of optical data transceivers including a first optical data transceiver and a second optical data transceiver respectively disposed at separate connector ends of the AOC to facilitate optical data communications using the at least one optical fiber;
    a common central processor configured to provide consolidated processing facilities for the plurality of optical data transceivers; and
    at least one data communication element to facilitate data communications between the common central processor and the plurality of optical data transceivers;
    wherein processing operations involving the control and monitoring of the plurality of optical data transceivers are performed at the common central processor.

* * * * *